United States Patent [19]
Squires et al.

[11] Patent Number: 5,524,859
[45] Date of Patent: *Jun. 11, 1996

[54] SECURITY MOUNTING FOR AUDIO EQUIPMENT IN A MOTOR VEHICLE

[76] Inventors: Carlton G. Squires, 1008-2930 Wildwood Drive, Windsor, Ontario, Canada, N8R 1Z3; Leslie A. Squires, 17 Glenwood Road, Ingersoll, Ontario, Canada, N5C 3N7

[*] Notice: The term of this patent shall not extend beyond the expiration date of Pat. No. 5,184,489.

[21] Appl. No.: 194,462

[22] Filed: Feb. 8, 1994

[51] Int. Cl.⁶ .................................................. F16M 13/00
[52] U.S. Cl. .................... 248/551; 248/27.1; 248/298.1; 70/58; 312/319.7
[58] Field of Search ................................. 248/27.1, 201, 248/551, 293, 298.1; 70/58, 57, 258; 312/7.1, 319.7

[56] References Cited

U.S. PATENT DOCUMENTS

| | | | |
|---|---|---|---|
| 4,979,774 | 12/1990 | Houser | 296/70 |
| 4,995,680 | 2/1991 | Miruri | 312/7.1 |
| 5,031,975 | 7/1991 | Anderson | 312/319 |
| 5,184,489 | 2/1993 | Squires et al. | 70/58 |

*Primary Examiner*—Karen J. Chotkowski
*Assistant Examiner*—Gwendolyn Wrenn
*Attorney, Agent, or Firm*—Daryl W. Schnurr

[57] ABSTRACT

An anti-theft mounting for radios, stereos and similar audio equipment used in motor vehicles has several features to discourage and possibly prevent the theft of equipment. The audio equipment is mounted within an opening in a dash of a motor vehicle. The equipment is partially mounted within a housing which moves forward so that a front of the equipment extends out of the opening when the equipment is desired to be used and moves rearward when the equipment is not desired to be used. When the equipment is in the rearward rest position, a door closes the opening. When the equipment is desired to be operated, the door opens and the equipment protrudes at least partially from the opening for easy access. The opening is sized so that while the equipment will fit snugly through the opening, the housing will not. The door and the equipment are controlled by worm gears. One worm gear controls the forward and rearward movement of the housing and audio equipment and two additional worm gears control the door. The use of worm gears allows locks to be eliminated. When a person legitimately desires to remove the equipment, this can be accomplished easily with special tools. Previous anti-theft devices for radios and the like do not provide sufficient protection for the radio or do not provide appropriate access to the radio when it is desired to be used.

5 Claims, 5 Drawing Sheets

SECURITY MOUNTING FOR AUDIO EQUIPMENT IN A MOTOR VEHICLE

BACKGROUND OF THE INVENTION

1. Field of the Invention

This invention relates to a secure mounting for using and storing audio equipment in a motor vehicle, and more particularly, to a mounting that automatically moves the radio inside an opening within the dash when the vehicle is not operating and moves the equipment partially outside of the opening when the vehicle is operating.

2. Description of the Prior Art

Anti-theft devices for radios and stereo equipment in motor vehicles are known. U.S. Pat. No. 4,726,632 to Pori discloses an assembly to fasten a radio receiver into dashboards of motor vehicles. In the Pori patent, a radio is located within a housing, which in turn is located within an opening of a dashboard. Two doors are pivoted to a wall of the housing for closing the opening. The housing is maintained in a fixed position and the radio is movable between a recessed position within said dashboard and an extended position where a front surface of the radio is substantially flush with the opening. The doors are hinged to an upper and lower front edge of the housing. When the radio is in an extended position, the doors are open and in a horizontal position. When the radio is moved rearward, the movement of the radio pulls the doors closed. The radio is held within the housing by a single pin. Unfortunately, this device has some disadvantages in that the front doors can be pried open and the radio can be forced from the housing by overcoming the force of the single pin holding the radio within the housing. Also, when the radio is in an extended position, the doors can interfere with user access to the radio. Also, the radio described in Pori can be difficult to remove when the owner of the vehicle requires the radio to be replaced without breaking or bending the single pin.

U.S. Pat. No. 4,884,646 to Zambias describes an anti-theft device for automobile audio equipment in which the radio remains in a fixed recessed position within an opening in the dash of a motor vehicle. A sliding door is movable between a closed position blocking the opening and an open position permitting access to the radio. The door slides vertically upward and downward within suitable channels and is operable by means of a switch on the dash. The door extends beyond a lower edge of the opening so that the door cannot be easily pried open. This device suffers from a disadvantage in that the radio is not readily accessible to a user when the door is open. For example, particularly when the user is a driver, it can be difficult to tune or otherwise adjust the radio. Often, the user's vision of the radio will be blocked by a hand of the user which is inserted into the opening to adjust the radio. Also, if a thief is able to smash or otherwise remove the door, the radio is no more difficult to remove than a radio that is not recessed.

SUMMARY OF THE INVENTION

It is an object of the invention to provide a secure mounting for audio equipment in a motor vehicle but easily accessible to a user when the equipment is in use.

It is a further object of the present invention to provide a secure mounting for audio equipment in a motor vehicle where the equipment automatically moves from an operating position to a storage position and vice-versa. It is still a further object of the present invention that the audio equipment be easily removable by a person having keys to the vehicle and proper tools but is extremely difficult to remove by a person who does not have keys to the vehicle or does not have proper tools. It is still a further object of the present invention to provide a secure mounting for audio equipment whereby the equipment is behind a closed door when not in use and it is difficult to pry the door open or to smash the door in without damaging the equipment.

A secure mounting for using and storing audio equipment is used in a motor vehicle having a dash with an outer surface and a suitable opening therein and sufficient space behind said dash to accommodate the mounting and the equipment. The equipment has a front, rear, two sides, top and bottom with adjustment means on a front surface thereof. The motor vehicle has a power source for moving the mounting and an ignition, said mounting having:

(a) a movable housing affixed to said equipment by attachment means, said attachment means being externally accessible only when a front portion of said equipment extends beyond said housing, said housing and said equipment being immovable relative to one another when said attachment means is in place;

(b) said movable housing being slidable forward and rearward on a supporting frame, a first worm gear being supported adjacent to said housing, said housing having a first threaded receiving means suitably secured thereto to receive said worm gear, said first worm gear being connected to a first electric motor which in turn is connected to said power source, said first electric motor being reversible;

(c) said first electric motor being rotatable in one direction to move said housing forward to an operating position for said equipment and being rotatable in an opposite direction to move said housing rearward to a rest position;

(d) in said forward position, at least said front of said equipment extending into said opening, while said rear and said housing remain behind said opening, and in said rearward position, said front of said equipment being located behind said opening;

(e) a movable overhead door that is mounted to move upward and rearward away from said opening when the door is open and the equipment is in use and downward and forward to close said opening when the equipment is not in use.

DESCRIPTION OF A PREFERRED EMBODIMENT

Figure 1:
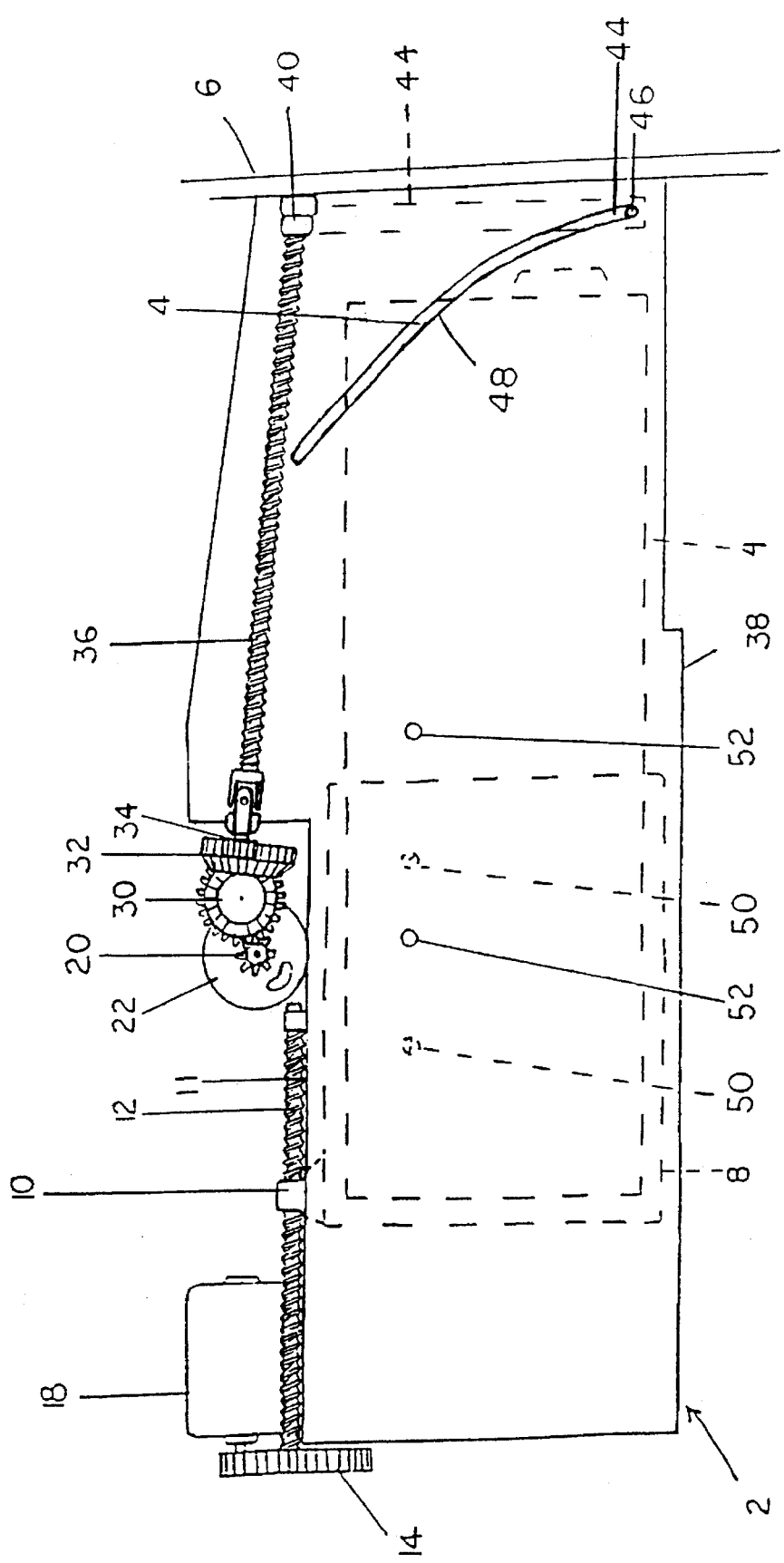
FIG. 1 is a partial side view of a radio contained in a movable housing in a rest position.
Figure 2:
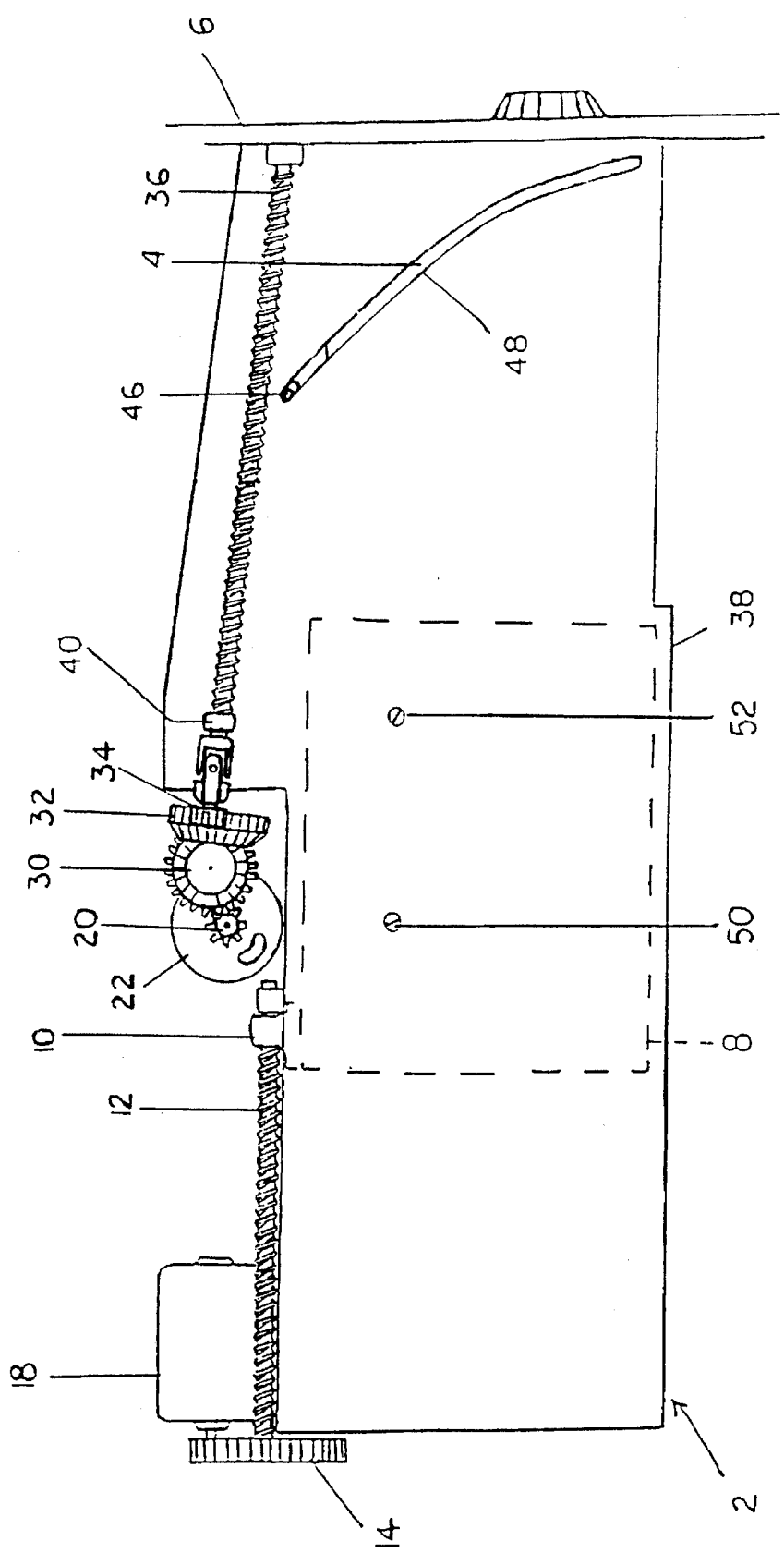
FIG. 2 is a partial side view as shown in FIG. 1 with the radio in an operating position.

In FIGS. 1 and 2, there is shown a partial side view of a secure mounting 2 whereby audio equipment 4 (for example a radio), can be stored within an opening (not shown in FIGS. 1 and 2) of a dash 6 in a motor vehicle (not shown).

Figure 3:
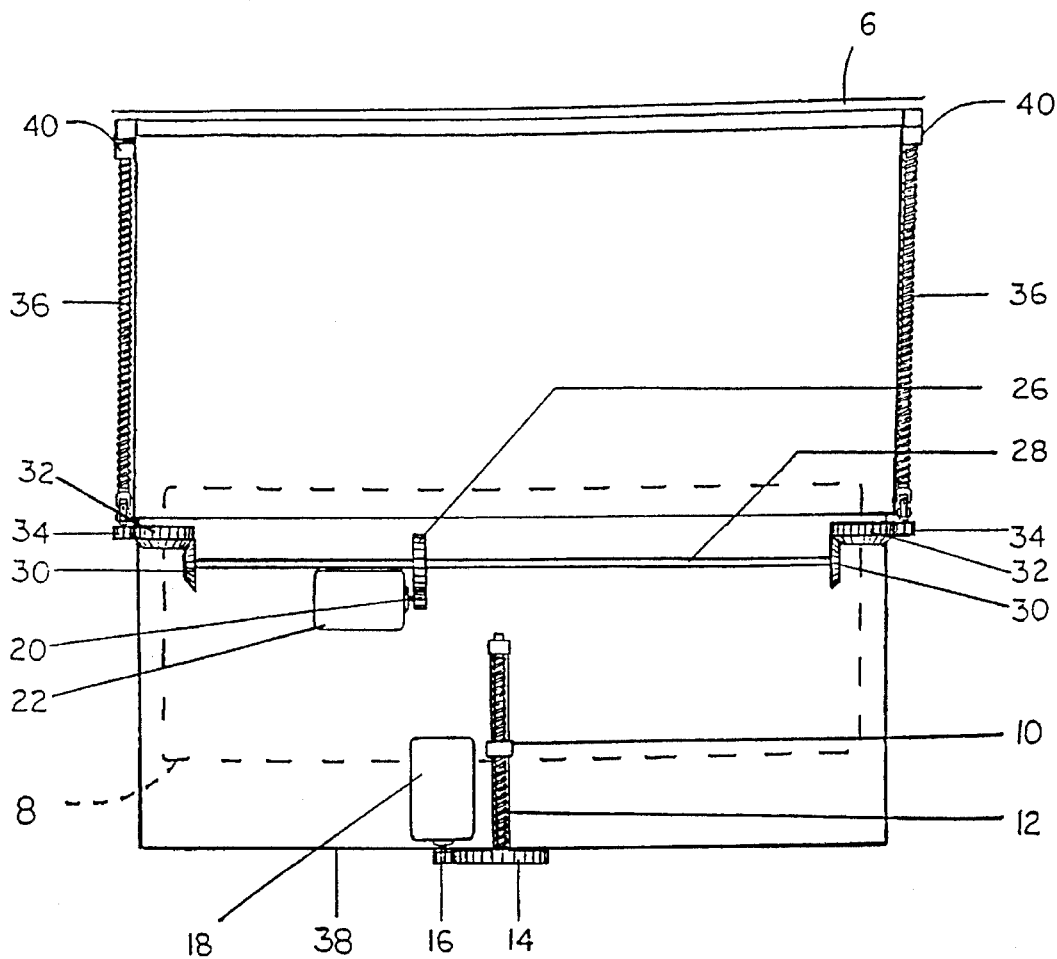
FIG. 3 is a top view of said radio and housing with said radio in a rest position.

A radio 4 is mounted partially within a movable housing 8, said housing having a threaded receiving means 10 located on an upper surface 11 thereof. The receiving means 10 engages a worm gear 12 so that as the worm gear 12 is rotated the receiving means 10 is caused to move forward or rearward (depending on the direction of rotation of the worm gear 12), thereby moving the housing and radio 4 in the same direction. The worm gear 12 is attached to a first gear 14 that in turn engages a second gear 16 on an electric motor 18 (see FIG. 3). The motor 18 is connected in a conventional manner so that when the second gear 16 on the motor is caused to turn, the first gear 14 and worm gear 12 will also turn, thereby moving the radio 4 forward or rearward accordingly.

A third gear 20 on a second electric motor 22 engages a vertical fourth gear 26 attached to a shaft 28 that is attached at both ends to two fifth gears 30. These fifth gears 30 in turn engage perpendicularly two sixth gears 32 that engage two further seventh gears 34 attached via universal joints to two worm gears 36 mounted on the upper sides of a frame 38. The second motor 22 is connected in a conventional manner to the vehicle's electrical system so that when the third gear 20 on the motor is caused to turn, the gears 26, 30, 32 and 34 will cause the worm gears 36 to turn accordingly. Reversing the direction of rotation of the motor 22 causes the reversal of the direction of rotation of the worm gears 36.

Engaging each worm gear 36 is a threaded receiving means 40 mounted on either side of the frame 38. The receiving means 40 is attached to upper guide pins (not shown), of the overhead door 44 that closes the opening (not shown) when the radio 4 is in a rest position (as seen in FIG. 1). The receiving means 40 is attached to the upper guide pins in such a way that the receiving means can pivot thereon, thus allowing an angle of a door 44 to change relative to the receiving means 40 as said receiving means moves along the worm gears 36 during opening or closing of the door 44. As the door moves, the guide pins slide within grooves (not shown), which lie behind the worm gears 36. Two additional guide pins 46 at the bottom of the door slide within grooves 48 when the door 44 is moved. Therefore, as the worm gears 36 are turned, the receiving means 40 moves forward or rearward accordingly, causing the door to open or close.

If, during the closing of the door, the movement of the door is obstructed, the motors for the door and the equipment are connected to control means (not shown) to automatically reverse the door and return the mounting to the open position.

Prior to the radio 4 moving from the rearward rest position to the forward operating position, the door 44 must be opened. Preferably, when the door is closed, the radio is located immediately behind said door. When it is desired to move the radio from the rearward to the forward position, the radio is first moved rearward briefly to provide sufficient room for the door to open. Thus, the radio and door will move from their positions shown in FIG. 1 to those shown in FIG. 2.

The worm gears 12 and 36 used to move both the door and housing provide a simple additional security measure. When the worm gears 12 and 36 turn, they cause the receiving means 10 and 40 respectively to move forward or rearward. However, when the worm gear is not turning, the worm gear prevents further motion of the receiving means forward or rearward. Furthermore, a force (push or pull) on the radio (and/or housing) or door will not move the radio or door unless the worm gear or threaded attachment is stripped. Therefore, the worm gears provide a simple alternative to complicated locking means.

The radio 4 can be attached to the housing 8 by using screws 50 or the like, which can be attached at the sides of the housing 8. Preferably, the screws (or the openings for said screws), will only be accessible when the housing and radio are in the forward operating position by means of openings 52 on either side of the frame 38 that line up with the screws only when the housing is in the forward position. This prevents unauthorized removal since the ignition must be on to access these screws.

The motors 18, 22 and control means (not shown) of the present invention are preferably connected directly to the ignition (not shown) of the motor vehicle with which the mounting is used. Thus, when the ignition is turned on, the door 44 opens and the radio 4 or other audio equipment automatically moves forward to the operating position shown in FIG. 5. Similarly, when the ignition is turned off, the radio 4 automatically moves rearward and the door is closed to the position shown in FIG. 6. After the door closes, the radio 4 preferably moves forward slightly so that it is located in a rest position immediately to the rear of the door. It should be noted that the door in FIG. 6 does not have a raised central portion. The raised central portion would make an outer surface of the door flush with the rest of the dash.

Figure 5:
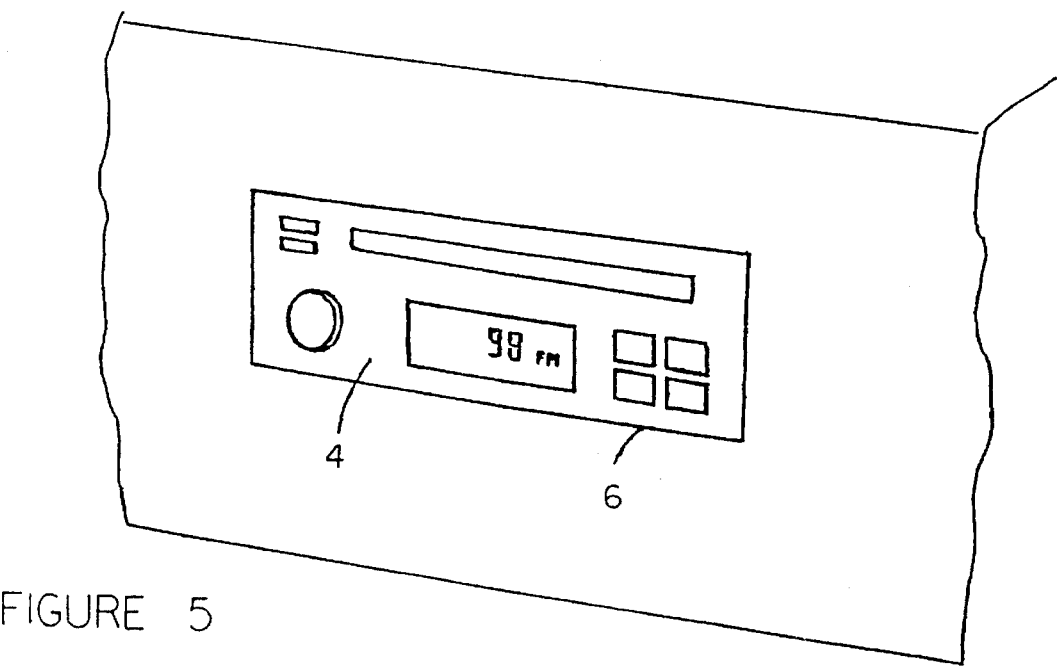
FIG. 5 is a partial perspective front view of said radio in an operating position within an opening in a dash.
Figure 6:
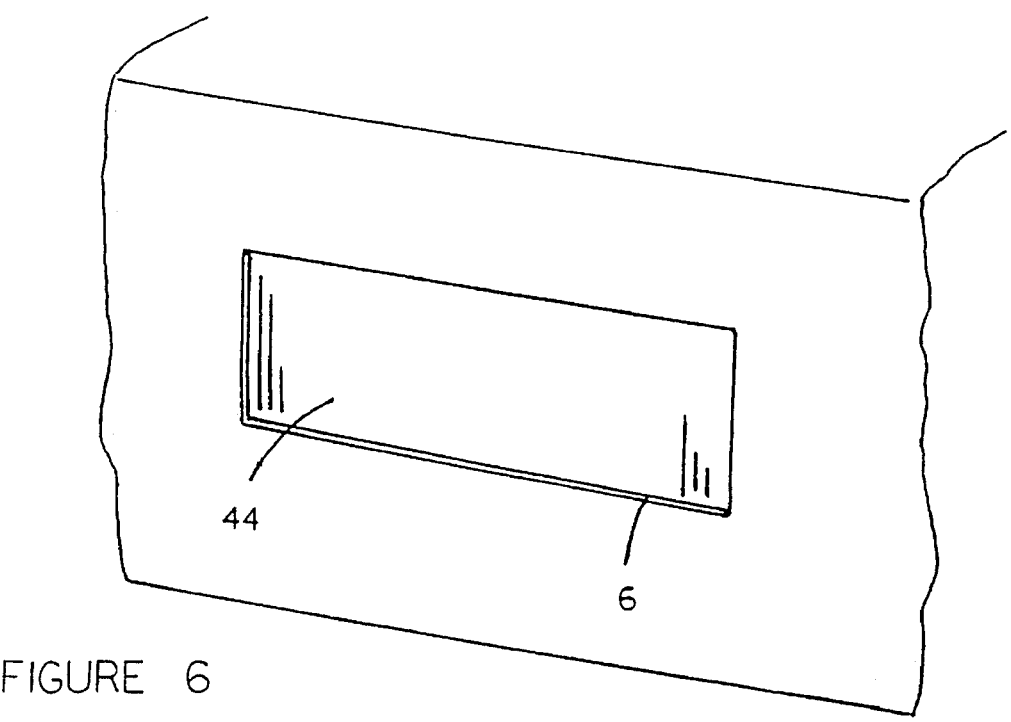
FIG. 6 is a partial perspective view of a door in a closed position in said dash.

From FIG. 5, it can be seen that a user of the radio has completely unobstructed access to the radio when the radio is in the forward operating position. Also, when the door is closed and the door is flush with the remainder of the dash, it would be difficult to determine whether or not the vehicle had in fact a radio. Alternatively, a fake radio faceplate could be affixed to the front of the door deceiving onlookers into believing that the vehicle had a much less expensive radio than it actually had; one that might not be worth stealing.

Since the radio moves forward briefly after the door is closed so that it is located immediately behind the door, if a person decided to smash the door, the radio itself would become damaged as it is located so close to the door. The last result that a thief would want would be to damage the valuable article that he or she is attempting to steal. As the door is slightly larger than the opening, it would be difficult to pry the door out of position. Even if that occurred, it would be difficult to separate the radio from the housing. If the radio could not be separated from the housing, it would not be removed from the dash as the housing is larger than the opening.

Figure 4:
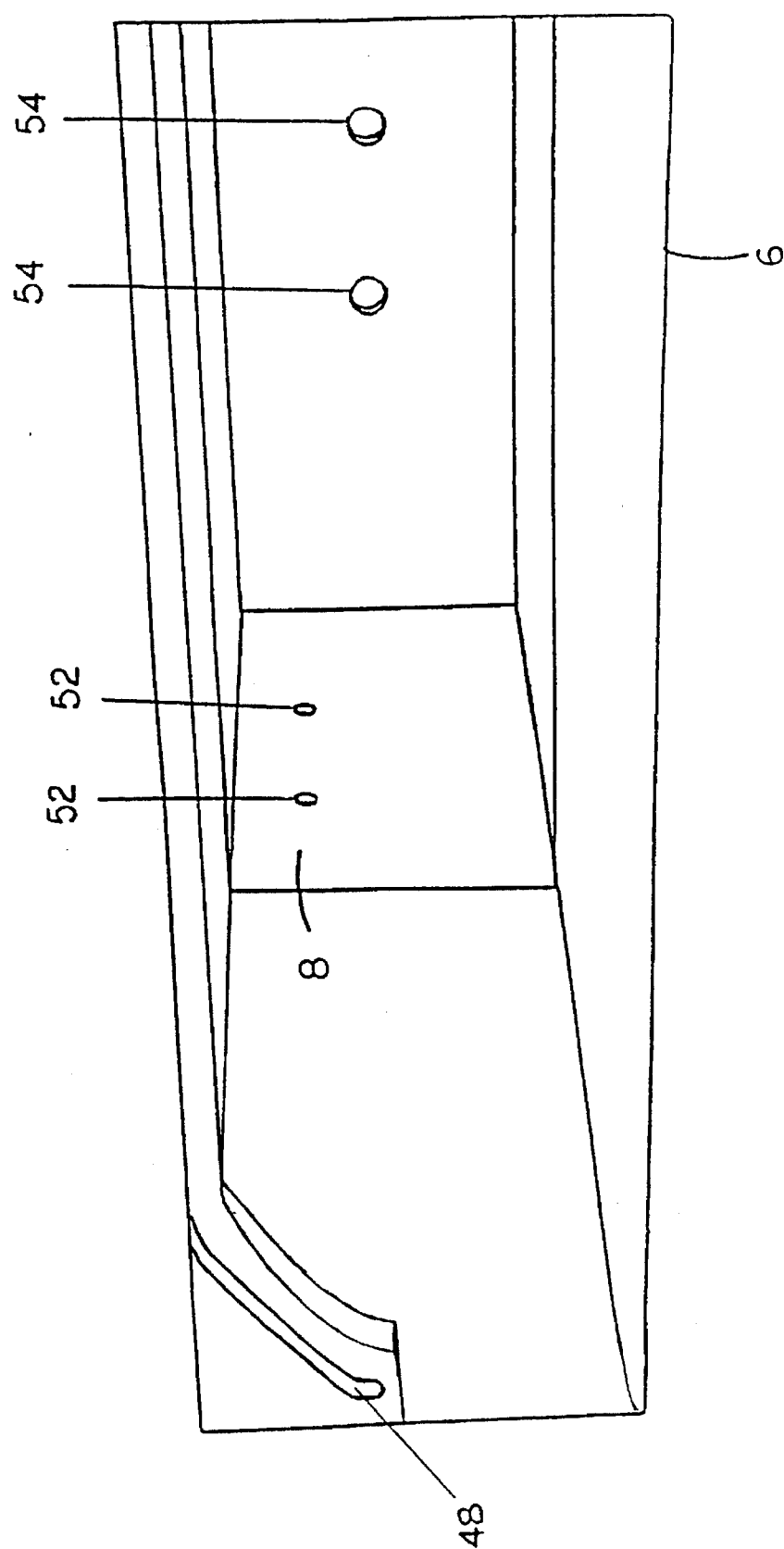
FIG. 4 is a partial perspective view of an interior of said housing with the radio removed.

Preferably, the mounting 2 is attached to the firewall or the like using some type of conventional connected structure which is attached to the back of the mounting. This connection could be easily unlocked from inside the mounting (radio having been removed), via holes 54 in the rear of the housing to access the attachment screws or the like (see FIG. 4).

The mounting could also be removed with the radio still attached using a gear assembly (not shown) attached to the connecting structure, that would unlock the connecting structure closer to the firewall. For example, turning a screw on this gear assembly would eventually release the whole mounting, but this could only be accomplished when the ignition is on because an electric servo motor would not engage the screw to the release gear if the ignition was not on. Further security and reliability could be added by including switches in this circuit, one or more of which could be hidden in the car. These switches would have to close the circuit in order for the electric servo motor to engage the release gear. The whereabouts of these switches need only be known to the owner.

If, during the closing of the door the movement of the door is obstructed, the motors for the door and the equipment are connected to control means to automatically reverse and the door will return to the open position. One way to have the motors reverse is to use a relay switch in the circuit between the motors and the door. When the door stops, the resistance in the circuit drops and the current through the relay switch causes the motors to reverse.

What we claim as our invention is:

1. A secure mounting for using and storing audio equipment in a motor vehicle having a dash with an outer surface and a suitable opening therein and sufficient space behind said dash to accommodate the mounting and the equipment, said equipment having a front, rear, two sides, top and bottom with adjustment means on a front thereof, said motor vehicle having a power source for moving the mounting and an ignition, said mounting comprising:

(a) a movable housing affixed to said equipment by attachment means, said attachment means being externally accessible only when a front portion of said equipment extends beyond said housing, said housing and said equipment being immovable relative to one another when said attachment means is in place;

(b) said movable housing being slidable forward and rearward on a supporting frame, a first worm gear being supported adjacent to said housing, said housing having a first threaded receiving means suitably secured thereto to receive said first worm gear, said first worm gear being connected to a first electric motor which in turn is connected to said power source, said first electric motor being reversible;

(c) said first electric motor being rotatable in one direction to move said housing forward to an operating position for said equipment and being rotatable in an opposite direction to move said housing rearward to a rest position;

(d) in said operating position, at least said front of said equipment extending into said opening, while said rear and said housing remain behind said opening, and in said rest position, said front of said equipment being located behind said opening;

(e) a movable overhead door with means for slidably moving a lower edge of said door upward and rearward away from said opening when the door is open and the equipment is in use and downward and forward to close said opening when the equipment is not in use.

2. A mounting as claimed in claim 1 wherein the door is mounted as an overhead door that moves upward and rearward away from said opening when the door is opened and downward and forward to cover said opening when the door is closed.

3. A mounting as claimed in claim 1 wherein the mounting is controlled to move the equipment forward briefly towards the door after the door is closed and to move the equipment rearward briefly away from the door just before the door opens.

4. A mounting as claimed in any one of claims 1 and 3 wherein there is a second electric motor and a second worm gear, said worm gear being connected to second threaded receiving means, said second electric motor being connected to said power source and being reversible, said receiving means being connected to said door so that when the worm gear turns in one direction the door is opened and when the worm gear turns in an opposite direction the door is closed.

5. A mounting as claimed in any one of claims 1 and 3 wherein there is a second electric motor, said motor being mechanically connected to a second worm gear and a third worm gear, said second and third worm gears being located on opposite sides of said housing, there being second threaded receiving means and third threaded receiving means affixed to said door to receive said second and third worm gears respectively, said second electric motor being connected to said power source and being reversible so that when the worm gears turn in one direction, the door is opened and when the worm gears turn in an opposite direction, the door is closed, said door being mounted in suitable guide means.

* * * * *